UNITED STATES PATENT OFFICE.

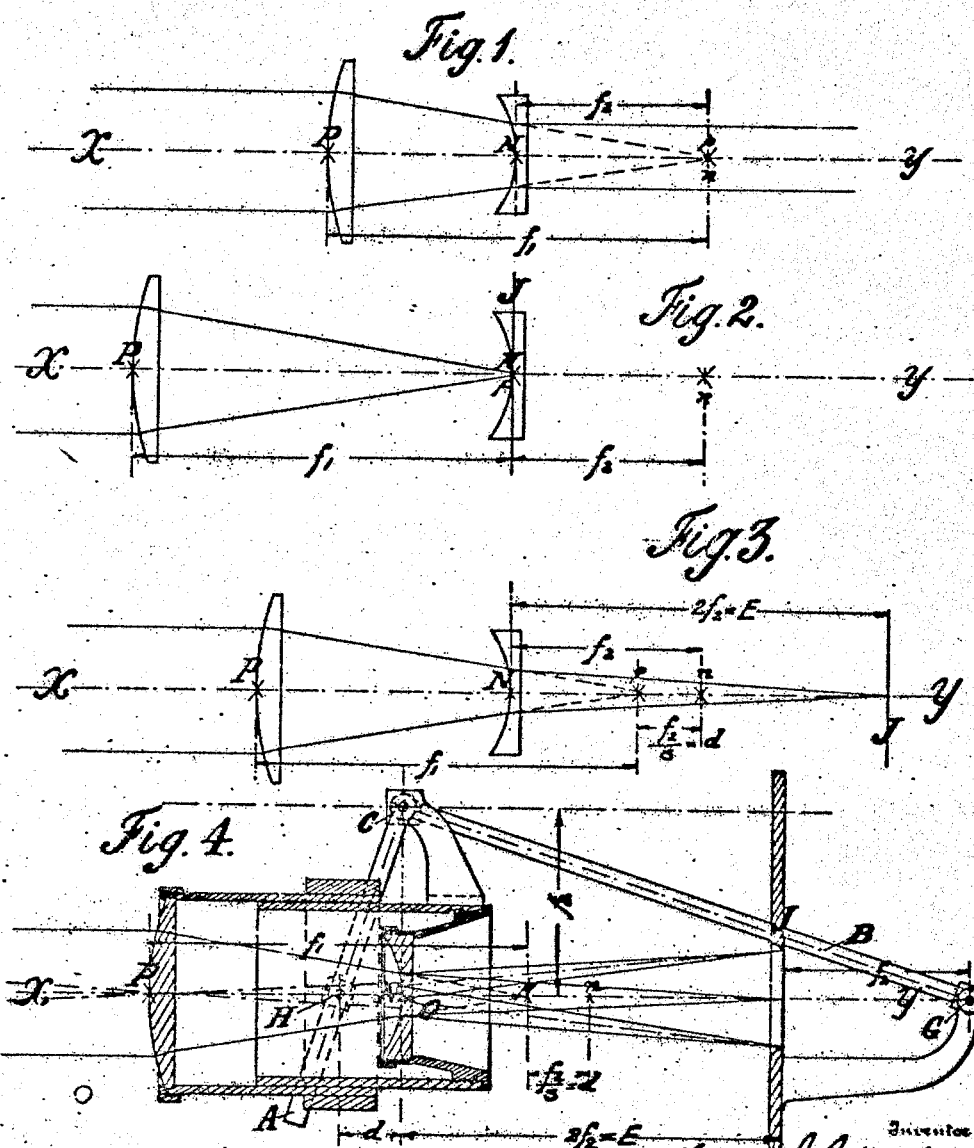

LODEWYK J. R. HOLST, OF PHILADELPHIA, PENNSYLVANIA.

TELEPHOTOGRAPHIC APPARATUS.

1,138,217.  Specification of Letters Patent.  Patented May 4, 1915.

Application filed August 29, 1914. Serial No. 859,182.

*To all whom it may concern:*

Be it known that I, LODEWYK J. R. HOLST, a citizen of the United States, residing in the city of Philadelphia, in the county of Philadelphia and State of Pennsylvania, have invented certain new and useful Improvements in Telephotographic Apparatus, of which the following is a specification.

The object of the present invention is to provide means, whereby the distance between positive and negative elements of a tele-photo system can be automatically kept in accord with the conjugate distance between the negative element and the image surface during adjustments of the latter distance for varying degrees of magnification; and for a fuller understanding of the said invention in connection with the following description thereof it must be understood that the adjustments above referred to are entirely independent of whatever focusing adjustment of the positive element may be required to compensate for the proximity of the object to be photographed, and the optical formulæ developed in this specification will fully satisfy this condition when the value F of the tele-photo system is considered in connection with the actual focus $f_1$, of the positive element and not with its equivalent or principal focus.

It is well known that the magnification produced by a tele-photo system depends on the distance $d$, between the focal points of the positive and the negative components in accordance with the following formula viz:—

$$F = f_1 \times \frac{f_2}{d}$$

in which F, is the actual focal length of the system. $f_1$ is the actual focal length of the positive element. $f_2$ is the focal length of the negative element; and $d$, the distance separating their focal points, also known as the optical interval, and inasmuch as the proportion of the focal length F, of the entire system and of the focal length $f_1$, is the ratio of magnification which is designated as $n$ it follows that for any ratio of magnification $n$ which may be desired, $\frac{f_2}{d}$ must equal $n$, whereby F will equal $f_1 \times n$.

It will thus be seen that it will simplify further calculation, if the distance $d$, be expressed in parts of the focal length $f_2$ of the negative lens, because in that case it can be immediately concluded that for say 3 diameters of magnification the distance $d$ must be $\frac{f_2}{3}$ or $\frac{f_2}{n}$. This fact also demonstrates that all practically useful values of $d$ must lie between $d=o$ and $d$ equals $f_2$, because in the first case F becomes infinite and in the second case F equals $f_1$ and the tele system offers no magnification in this instance, the image plane coinciding with the negative lens.

For the better explanation of my invention reference is made to the accompanying drawings forming part of this specification, illustrating diagrammatically means for carrying into effect my said invention, in which—

Figure 1, shows diametrically a tele-photo system at its minimum distance. Fig. 2, shows the same system at its maximum distance. Fig. 3, shows the same system adjusted to give a magnification of 3 diameters. Fig. 4, shows the same system as adjusted in Fig. 3 and in diagrammatic view, a mechanical means for its adjustment.

For the sake of simplicity only single positive and negative elements are shown in these drawings, but the scope of this invention includes as well any composite elements, as they are subject to the same optical laws and always have their single-lens equivalents.

In Fig. 1, the lenses are placed so that the point $n$, forms the focal point $p$, of the positive lens P, and at the same time constitutes the focal point $n$, of the negative lens N. The distance $d$, between these focal points being thus zero, a bundle of parallel rays collected by the positive lens, emerges in a parallel bundle from the negative lens and the focal length F, of the system is infinite, since $$F = f_1 \times \frac{f_2}{\text{zero}} = \text{infinite.}$$

In Fig. 2, the distance between the focal point $p$, of the positive lens P, and of the focal point $n$, of the negative lens N, is equal to the focal length $f_2$ of the negative lens, hence in this case $$F = f_1 \times \frac{f_2}{f_2} = f_1,$$

and consequently the magnification is 1 since $$\frac{F}{f_1} = 1.$$

Referring now to Fig. 3, it will be observed that if for instance the distance between the points $p$ and $n$, has been adjusted to equal $\frac{1}{3}$ of the focal length $f_2$ of the negative lens N, it will be seen that by applying the same rule, $$F = f_1 \times \frac{f_2}{\frac{f_2}{3}} = 3f_1,$$

and consequently the magnification produced by the tele-photo system is 3, since the image it produces is equal to 3 times the size of the images produced by the positive element of a focal length $f$. Furthermore in accordance with the laws of optics the distance E, between the negative lens and the image is always $$(n-1) \times f_2$$

when $n$ represents the ratio of magnification, so that in the case illustrated in Fig. 3, the image will be placed $$(3-1) \times f_2 = 2f_2$$

behind the negative lens. The distance $(n-1)f_2$ can also be expressed $nf_2 - f_2$ and it will be observed that for a negative lens of any given focal length the only variable factor in that expression is the value $n$. Comparing now the values of the distances $d$, with the corresponding or conjugate image distances E, for the varying values of $n$, we find $$d = \frac{f}{n}$$

and $$E = f_2 \times n - f_2$$

in which expressions the terms $\frac{f_2}{n}$ and $f_2 \times n$, respectively are continuously the extremes of a proportion, of which $f_2$ is constantly the geometrical mean.

Inasmuch as in every individual case the value $f_2$ is constant, the variations in the values of the conjugate distances $d$ and E, conforming with varying values of $n$, can be mechanically obtained by means of a rectangle-lever ACB, as diagrammatically illustrated in Fig. 4. The arm CB is slidably guided in the pivoted sleeve G, the center of the pivot of which is placed exactly at a distance $f_2$ behind the image receiving surface J. The point C, is guided in a line parallel to the optical axis XY, of the system and is rigidly attached to the setting of the negative lens N, so that this lens will move in unison with any shiftings of the point C. The arm AC, passes at H through a pivoted guide sleeve supported by the setting of the positive-lens P. The imaginary line HG, which forms the hypotenuse of the rectangular triangle HCG, is also parallel to the optical axes XY, hence equally parallel to the path of travel of the apex C. When now finally the distance of the point C, from the line HG, be made equal to the focal length $f_2$ of the negative-lens N, it is found that a perpendicular on the line HG, drawn through the apex C, no matter to which point the latter has been shifted, divides the line HG, at O, in such a manner that $$HO : OC = OC : OG$$

We may express the value of OG in functions of OC and since the latter is equal to $f_2$, we can write the last equation, as follows:—

$$HO : f_2 = f_2 : nf_2$$

hence $$HO = \frac{f_2}{n}$$

and since $OG - f_2 = E$ is the required distance between the negative lens and the image for $n$ magnifications, $HO = \frac{f_2}{n}$ will be the corresponding or conjugate distance $d$ between the focal points $p$ and $n$, to produce this magnification and consequently the correct conjugate distances $d$ and E, respectively, between the focal points of the positive and the negative lens, and between the latter and the image surface for varying degrees of magnification are automatically maintained during all shiftings of the point C, by the action of the rectangle-lever ACB on the points H and G.

Having now fully described the nature and objects of my invention as well as manner in which the same may be performed, what I claim as new and desire to secure by Letters Patent is:

1. In tele-photographic apparatus, a positive element, a negative element, an image surface and operative connections between the same adapted to cause the varying distances between the negative element and the image surface to automatically correspond with the conjugate distances between said negative element and said positive element.

2. In tele-photographic apparatus, a positive element movable along its optical axis and carrying pivoted guide-means in rigid relationship, a negative element movable along said optical axis and carrying in rigid relationship the pivot for a rectangle-lever, a support for an image-surface carrying also pivoted guide-means in rigid relationship thereto and a rectangle-lever, the intersection of the arms of which is carried by the pivot of said negative element, said arms respectively engaging the guide-means carried by said positive element and image-support, to thereby cause by the shiftings of the intersection point of said arms the proper relative shiftings of said positive and said negative elements with relation to said image-surface.

In witness whereof, I have hereunto set my signature in the presence of two subscribing witnesses.

LODEWYK J. R. HOLST.

Witnesses:
  THOMAS M. SMITH,
  ROSE E. SMITH.